United States Patent
Handing et al.

(10) Patent No.: US 11,942,648 B2
(45) Date of Patent: Mar. 26, 2024

(54) METHOD FOR PRODUCING A BATTERY CARRIER AND BATTERY CARRIER

(71) Applicant: BENTELER AUTOMOBILTECHNIK GMBH, Paderborn (DE)

(72) Inventors: Christian Handing, Langenberg (DE); Tobias Duepmeier, Paderborn (DE)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 148 days.

(21) Appl. No.: 17/331,842

(22) Filed: May 27, 2021

(65) Prior Publication Data

US 2021/0376416 A1  Dec. 2, 2021

(30) Foreign Application Priority Data

May 28, 2020  (DE) ..................... 10 2020 114 345.1

(51) Int. Cl.
| | |
|---|---|
| *H01M 50/207* | (2021.01) |
| *B60K 1/00* | (2006.01) |
| *B60K 1/04* | (2019.01) |
| *H01M 10/613* | (2014.01) |
| *H01M 10/6554* | (2014.01) |
| *H01M 10/6556* | (2014.01) |

(52) U.S. Cl.
CPC .............. *H01M 50/207* (2021.01); *B60K 1/04* (2013.01); *H01M 10/613* (2015.04);
(Continued)

(58) Field of Classification Search
CPC ........ B21D 53/02; B21D 53/88; B21D 51/18; B60K 1/04; B60K 11/02; B60K 2001/005;
(Continued)

(56) References Cited

U.S. PATENT DOCUMENTS

| | | | |
|---|---|---|---|
| 2018/0183116 A1* | 6/2018 | Hitz | .................... H01M 10/625 |
| 2018/0215282 A1* | 8/2018 | Pohl | ........................ B60L 58/26 |

(Continued)

FOREIGN PATENT DOCUMENTS

| | | |
|---|---|---|
| CN | 207993934 U | 10/2018 |
| CN | 110246999 A | 9/2019 |

(Continued)

OTHER PUBLICATIONS

Jones, David RH, and Michael F. Ashby. Engineering materials 2: an introduction to microstructures and processing. Butterworth-Heinemann, 2012, Chapter 15, p. 269 (Year: 2012).*

(Continued)

*Primary Examiner* — Matthew T Martin
*Assistant Examiner* — Jared Hansen
(74) *Attorney, Agent, or Firm* — HAUPTMAN HAM, LLP (57) ABSTRACT

In order to produce a battery carrier which has a battery tray with a cooling plate, a tray plate and a cooling plate are joined to one another, wherein the cooling plate has at least one preshaped cooling duct. The tray plate jointly with the cooling plate is then formed by folding to produce the battery tray. During the folding of the tray plate and the cooling plate, a cooling duct section is bent around a bottom edge of the battery tray. The cooling duct is provided with connection elements via which a cooling fluid is supplied and discharged. During the course of the finishing, end shape-producing shaping of the cooling duct can also be performed. Internal pressure is applied to the cooling duct in order to restore the shape of the cooling duct which collapsed due to the forming.

4 Claims, 7 Drawing Sheets

(52) U.S. Cl.
CPC ... *H01M 10/6554* (2015.04); *H01M 10/6556* (2015.04); *B60K 2001/005* (2013.01)

(58) Field of Classification Search
CPC .......... H01M 10/613; H01M 10/6554; H01M 10/6556; H01M 50/20; H01M 50/204; H01M 50/207; H01M 50/249; Y02E 60/10
See application file for complete search history.

(56) References Cited

U.S. PATENT DOCUMENTS

| | | | | |
|---|---|---|---|---|
| 2018/0229593 | A1* | 8/2018 | Hitz | ........................ B60L 50/64 |
| 2019/0074496 | A1* | 3/2019 | Hielscher | ................ B60L 50/64 |
| 2019/0283627 | A1 | 9/2019 | Gehringhoff et al. | |
| 2020/0398652 | A1* | 12/2020 | Stephens | .............. B62D 25/025 |

FOREIGN PATENT DOCUMENTS

| | | | | |
|---|---|---|---|---|
| DE | 10303542 | A1 | | 8/2003 |
| DE | 102010018040 | A1 | | 11/2011 |
| DE | 102018121727 | A1 | | 3/2019 |
| DE | 102018008302 | A1 | * | 4/2020 |
| EP | 0740969 | A1 | * | 11/1996 ........... B21D 26/041 |
| WO | WO-2015086669 | A2 | * | 6/2015 ........ H01M 10/0481 |

OTHER PUBLICATIONS

WO2015086669A2 Eberleh, et al., "Tier element, lateral part and a cooling module as well as a method for producing a cooling module", machine English translation retrieved from https://worldwide.espacenet.com/ Date: May 11, 2023 (Year: 2015).*

Thyssenkrupp "Deep-drawing steels DD, DC and DX", pp. 1-19, Nov. 2019 (Year: 2019).*

EP0740969A1, Sauer, "Process for manufacturing a metallic hollow corpus of complex shape", machine English translation retrieved from https://worldwide.espacenet.com/ Date: Sep. 5, 2023 (Year: 1996).*

DE102018008302A1, Tekkaya, et al., "Method and device for forming, in particular for profiling and bending, thin-walled profiles", machine English translation retrieved from https://worldwide.espacenet.com/ Date: Sep. 5, 2023 (Year: 2020).*

Office Action for German Application No. 10 2020 114 345.1 dated May 7, 2021; 22pp.

* cited by examiner

METHOD FOR PRODUCING A BATTERY CARRIER AND BATTERY CARRIER

RELATED APPLICATION(S)

The present application claims priority of German Application Number 10 2020 114 345.1 filed May 28, 2020.

FIELD

The disclosure relates to a method for producing a battery carrier which has a battery tray with a cooling plate, and to such a battery carrier.

BACKGROUND

In order to hold battery modules for providing electrical energy in electrically driven vehicles, battery carriers which are arranged between the axles of the vehicle are usually used. The battery carrier has to meet crash and leaktightness requirements and also integrate a cooling arrangement.

DE 10 2018 105 526 A1 relates to a method for producing a battery carrier for holding an electrical battery module. The battery carrier has a battery tray which is shaped by mechanical forming of a material blank. This can take place by folding or by deep-drawing. The battery tray comprises a double-walled base in which hollow channels are arranged.

A battery carrier for an electric vehicle having a battery tray which is produced as a folded component in one piece and in a materially integral manner from a blank is also disclosed by DE 10 2018 121 727 A1.

The supply of coolant, which takes place either within the battery tray from above or outside the battery tray from below or from the side, is difficult or complicated in battery carriers. Positioning of the connections within the battery carrier is critical owing to the risk of leakage and the associated risk of a short circuit. A connection at the bottom is disadvantageous for reasons of installation space. Lateral connections are structurally complicated. To this end, connection nozzles are inserted between the channel or cooling plate and the base plate of the battery tray and then have to be joined in a leaktight manner with process reliability.

The disclosure is based on the object of presenting a method for producing a battery carrier with a folded battery tray with a coolant supply which can be realized and with process reliability and also using standardized connection elements and of creating a battery carrier in respect of production.

SUMMARY

The method according to the disclosure for producing a battery carrier which has a battery tray with a cooling plate comprises the following steps:
providing a tray plate;
providing a cooling plate which has at least one preshaped cooling duct;
joining the tray plate and the cooling plate;
forming the tray plate jointly with the cooling plate to produce the battery tray, where, during the forming of the tray plate and the cooling plate, a cooling duct section is bent around a bottom edge or a side edge of the battery tray;
finishing the battery carrier, where the cooling duct is provided with connection elements.

In order to produce the battery tray, the tray plate and the cooling plate are joined to one another. The cooling plate is an initially planar plate in which at least one cooling duct is formed. The cooling plate and the tray plate are joined to one another. This takes place in a materially bonded manner by soldering. The joining of the tray plate and the cooling plate can also take place by pressure joining by roll-bonding, that is to say by rolling under high pressure. The joining of the tray plate and the cooling plate takes place in such a way that the cooling duct is connected in a pressure-tight and fluid-tight manner to the tray plate over the course of its length.

At least one embodiment of the disclosure provides that the tray plate and the cooling plate are joined to one another in a press by means of pressure soldering or in a soldering furnace.

The tray plate connected to one another and the cooling plate are then jointly formed and the body of the battery tray is formed. During the forming of the tray plate and the cooling plate, a cooling duct section is bent around a bottom edge or a side edge of the battery tray. In a corresponding manner, a wall section of the cooling plate is also bent around the bottom edge or the side edge of the battery tray. During the forming of the battery tray, the preshaped duct is therefore also bent in the connection region of the cooling arrangement. The cooling duct or a cooling duct section therefore runs on a side wall of the battery tray in a manner directed upward from the tray base. The cooling duct extends in the connection region up to close to the upper tray rim. In this way, a connecting region for connecting, with process reliability, connection elements, such as connection nozzles, which ensures lateral coolant supply is provided. Standardized connection elements can be employed or used.

The cooling duct extends from one side wall, across the side edge, into the next side wall of the battery tray.

During the finishing of the battery carrier, the cooling duct is provided with connection elements. This likewise takes place in a materially bonded manner by soldering.

The connection region is readily accessible from a side wall or end wall of the battery tray. For the connection of the connection elements, the cooling duct is provided with connection openings. The connection elements are, at or by way of their coupling section, inserted into the connection openings and joined in a materially bonded manner to the cooling duct.

The method according to the disclosure is efficient and provides coolant supply for a folded battery tray which can be implemented using standardized connection elements with process reliability.

One aspect of the disclosure provides that a tray plate is provided, the geometry of which corresponds to the developed view of the battery tray.

During the forming of the tray plate and the cooling plate to produce the battery tray, collapsing, that is to say a reduction in the diameter of the cooling duct, may occur. During the course of the finishing, the cooling duct in the cooling plate is therefore finally shaped. During the final shaping of the cooling duct, said cooling duct obtains its final inside cross section. For the final shaping, an internal pressure can be applied to the cooling duct. This can take place in a hydraulic or pneumatic manner. If the cooling duct diameter after the forming of the battery tray is too small, said cooling duct diameter can be expanded back to the desired radius after the forming. An external tensile force can also be applied to the cooling duct for the final shaping in order to restore the shape of the cooling duct and to provide the cooling duct with the required inside diameter.

The cooling duct can also be supported by an inner supporting element during the forming. The supporting element is a removable spacer which protects the cooling duct against collapsing or buckling. Such a supporting element can be realized, for example, by a wax core which is removed from the cooling duct after the forming.

The cooling plate can also have a material store which is formed into a bend of the cooling duct during the forming. In this way, the extension of the cooling duct during the forming process is equalized on the outer side of the bend. The material store is designed such that the cooling duct has the intended bending radius after the forming in the bend.

At least one embodiment of the disclosure provides that the tray plate is shaped by folding to produce the battery tray. After the joining of the tray plate and the cooling plate, the tray plate is folded jointly with the cooling plate to produce the battery tray, where, during the folding of the tray plate and the cooling plate, a cooling duct section is bent around a bottom edge or a side edge of the battery tray. The cooling duct section is bent around a bottom edge of the battery tray.

One alternative provides that the tray plate is shaped by deep-drawing to produce the battery tray. To this end, the tray plate and the cooling plate are joined. The tray plate and the cooling plate are then jointly deep-drawn and in the process a cooling duct section of the cooling duct is bent around a bottom edge or a side edge of the battery tray.

One refinement provides that the cooling plate extends over the tray base and at least one side wall of the battery tray. In this refinement, the cooling plate is bent around an end-side bottom edge and a longitudinal-side bottom edge of the battery tray. Here, the coolant supply takes place via the cooling duct sections at the end side of the battery tray.

Furthermore, during the finishing, abutting wall sections of the battery tray are joined to one another. This also takes place in a materially bonded manner by soldering. Folding corners of the battery tray are joined and sealed off during the finishing.

At least one embodiment of the disclosure provides that the cooling plate is joined to a side of the tray plate that forms an outer side of the battery tray after the forming.

A battery carrier according to the disclosure has a battery tray with a cooling plate. At least one cooling duct is provided in the cooling plate. The cooling duct runs along the tray base and extends over a bottom edge of the battery tray. The cooling duct therefore runs around the bottom edge. From the battery base, the cooling duct runs on a side wall of the battery tray upward up to close to below the upper tray rim. In this section, the cooling duct is provided with connection elements by means of which fluid-tight supply and discharge of a cooling fluid takes place.

The cooling plate is attached to the bottom side of the battery tray. The cooling plate runs, by way of an angled wall section, on a side wall, or on an end wall, of the battery tray. The cooling duct continues over the bent-over wall section of the cooling plate, that is to say runs upward from the tray base on the side wall or end wall. The cooling plate extends beneath the base of the battery tray. In this case, the cooling plate virtually completely covers the base. A front wall section of the cooling plate forms the connection region for the coolant supply and, respectively, coolant discharge. The front wall section is bent around the bottom edge of the battery tray and extends parallel to the end wall. In the front wall section, two cooling duct sections, by means of which the inflow and the outflow for coolant is realized, run parallel next to one another.

In a battery carrier according to the disclosure of alternative configuration, the cooling plate is also provided on a side wall. The cooling plate is joined to a side wall of the battery tray, where the cooling duct runs in a manner bent around a side edge of the battery tray. The cooling duct then extends from the first side wall along a second side wall of the battery tray. A respective connection element is in each case joined to a starting section and to an end section of the cooling duct.

As already stated, a cooling plate can be provided over the tray base and at least one side wall, a side wall on the longitudinal side, and an end side.

The cooling plate is soldered to the battery tray. The cooling duct or the cooling ducts extends/extend or runs/run over the tray base. One or two cooling duct sections run upward around a bottom edge of the battery tray in the Z-direction. These cooling duct sections of the cooling duct form the supply line and the discharge line for a cooling medium. The coolant supply into the cooling plate takes place outside the battery tray from above or from the side. In this way, a risk of leakage and therefore the risk of a short circuit can be precluded.

A crash frame can be arranged around the outside of the battery tray. The crash frame runs in an encircling manner and is manufactured from high-strength steel. The crash frame usually has a plurality of connected profile components.

The battery carrier or the battery tray and the cooling plate can be designed with a steel or aluminum sheet construction.

At least one embodiment of the method according to the disclosure, just like of the battery carrier according to the disclosure, provides that the battery tray is a folded component. The tray plate is folded jointly with the cooling plate to produce the battery tray, where, during the folding of the wall plate and the cooling plate, a cooling duct section is bent around a bottom edge or a side edge of the battery tray. Owing to the folding, the installation space of the battery tray is utilized in an optimum manner. There are small bending radii in the base and in the corners. The folded construction additionally reduces joining points and lengths with a requirement for leaktightness. Different options are available in order to secure a battery or battery modules in the battery tray. For example, a click or clamping system is practical.

The tray plate and the cooling plate can have different thicknesses from one another. The tray plate and, respectively, the battery tray folded from the tray plate, just like the cooling plate, can also have sections with wall thicknesses which are different from one another.

BRIEF DESCRIPTION OF THE DRAWINGS

The disclosure is described in more detail below with reference to drawings, in which.

DETAILED DISCLOSURE

FIG. 1 to FIG. 10 and FIG. 12 show a battery carrier 1 according to the disclosure and components thereof.

The battery carrier 1 has a battery tray 2 with a cooling plate 3. The battery tray 2 is of rectangular configuration in cross section and has a tray base 4 and side walls, specifically in each case two longitudinal walls 5, 6 and two end walls 7, 8 which complement each other to form an encircling wall. Outwardly directed flange sections 10 extend along the longitudinal walls 5, 6 and the end walls 7, 8 on the upper tray rim 9 and likewise complement each other in an encircling and closed manner to produce an upper flange.

Figure 11:
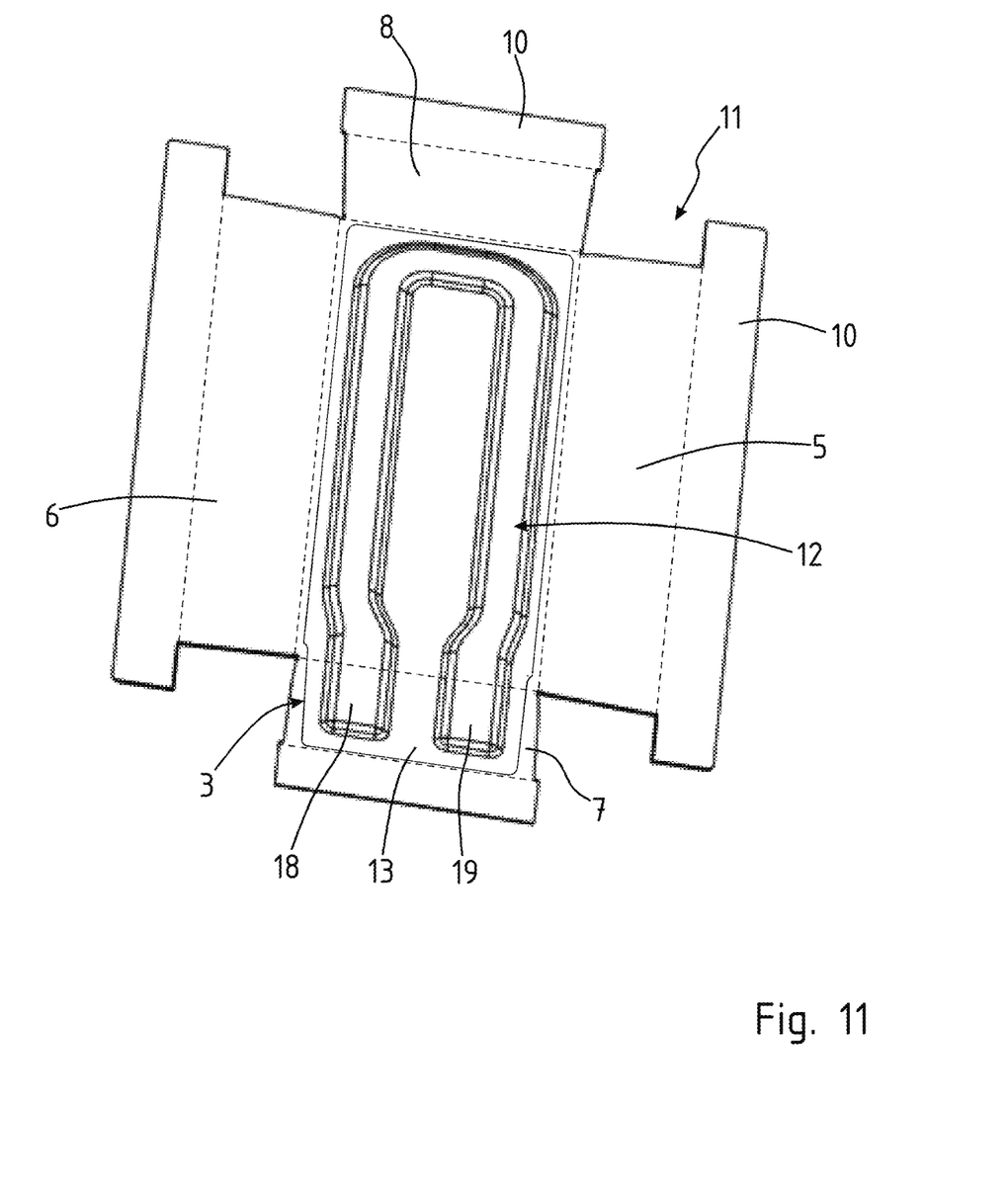
FIG. 11 shows a developed view of a tray plate with a cooling plate.

The battery tray 2 is produced from a tray plate 11 as a folded component. To this end, a tray plate 11 is provided, the geometry of which corresponds to the developed view of the battery tray 2 (see FIG. 11 in this respect). Furthermore, a cooling plate 3 is provided. The cooling plate 3 has at least one preshaped cooling duct 12. The tray plate 11 and the cooling plate 3 are joined to one another. A two-layer body comprising the tray plate 11 and the cooling plate 3 is formed. The tray plate 11 and the cooling plate 3 are soldered to one another. The cooling plate 3 extends below the tray base 4 and virtually completely covers the tray base 4.

The cooling duct 12 is of approximately rectangular configuration in cross section and has a greater width than depth. The cooling duct 12 runs with a U-shaped configuration along the cooling plate 3. A front wall section 13 of the cooling plate 3 extends over the wall region of the tray plate 11, which wall region forms the end wall 7 on the folded battery tray 2. The cooling duct 12 has a first limb 14 and a second limb 15 which merge with one another by means of an arc section 16. The limbs 14 and 15 each continue by means of a transition section 17 into end-side cooling duct sections 18, 19 which extend over the wall section 13.

The tray plate 11 joined to one another and the cooling plate 3 form a sandwich or a two-layer body from which the battery tray 2 is formed by folding. The fold lines are illustrated using dashed lines in FIG. 11. During the folding process, the tray plate 12 and the front wall section 13 of the cooling plate 3 are jointly folded. During this folding process, the cooling duct 12 or the cooling duct sections 18, 19 is/are bent around a bottom edge 20 of the battery tray 2. The cooling duct 12 is guided around the bottom edge 20 by means of a respective bend 21 and is continued by the cooling duct sections 18, 19 which run in the Z-direction.

Figure 6:
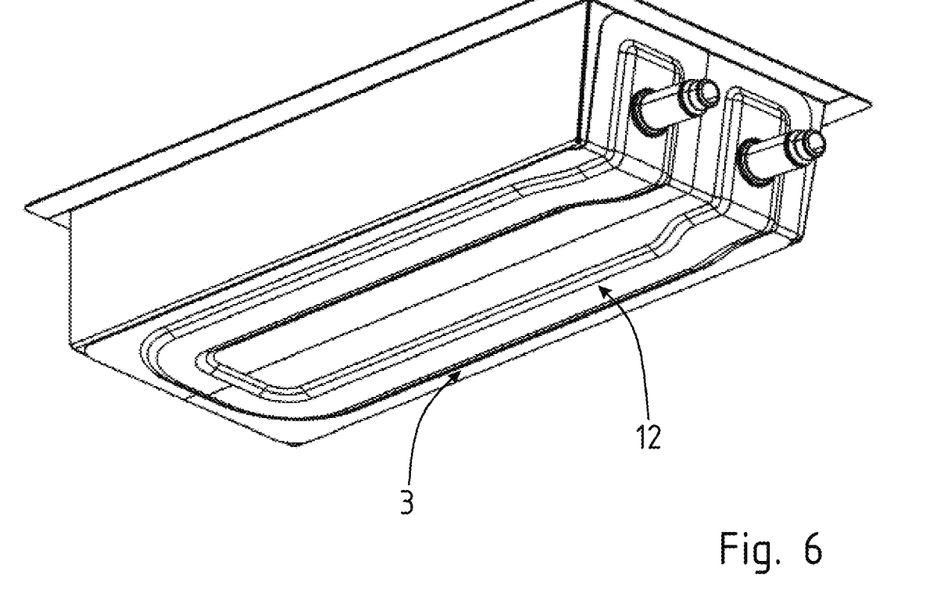
Figure 7:
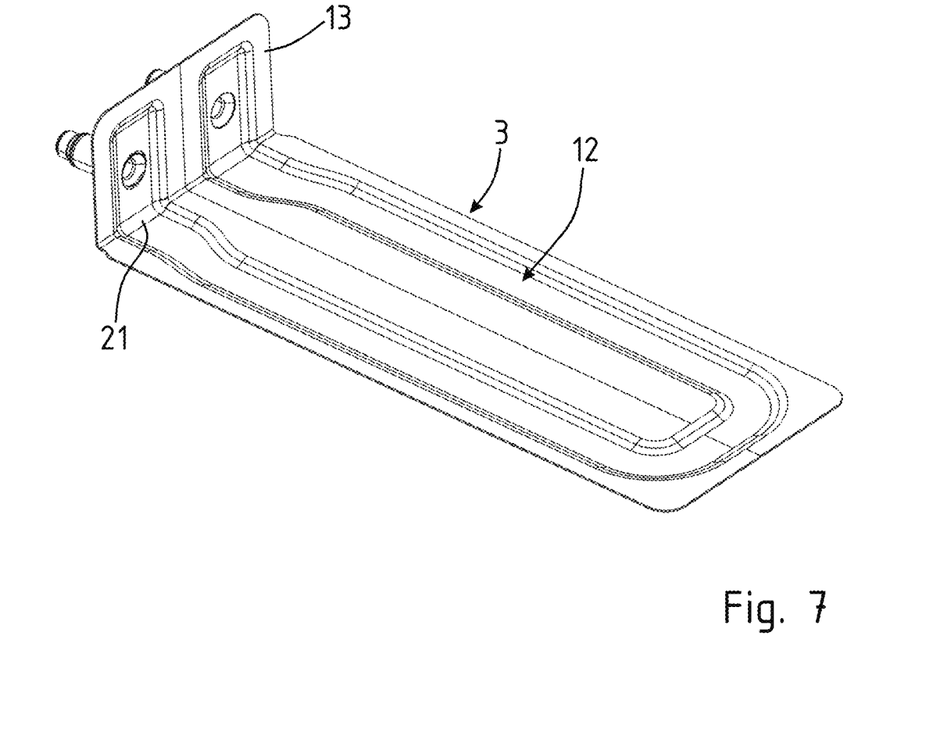
Figure 8:
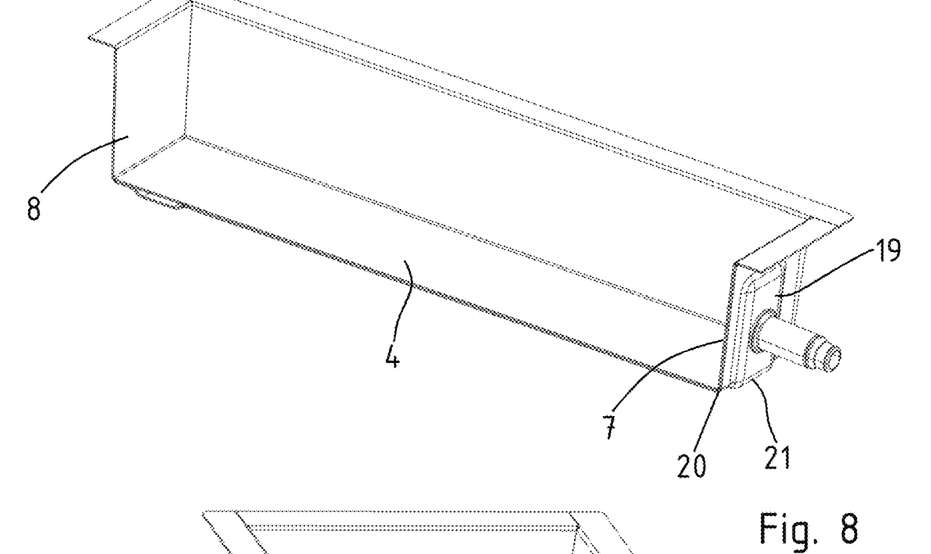

FIG. 6 shows the battery carrier 1 in a view laterally from below. FIG. 7 shows the bent cooling plate 3 without the battery tray.

After the folding of the tray plate 11 to produce the battery tray 2, the abutting longitudinal walls 5 and, respectively, 6 and end walls 7 and, respectively, 8 and also the flange sections 10 are respectively joined to one another in a materially bonded manner, joined in a fluid-tight manner, in their abutment region. This takes place by soldering.

During the course of the finishing, the cooling duct 12 is provided with connection elements in the form of connection nozzles 22, 23 in each of the two cooling duct sections 18, 19 which are directed upward from the tray base 4. The supply and discharge of a cooling fluid to/from the cooling duct 12 is realized in this way.

During the bending of the cooling duct 12 around the bottom edge 20, the cooling duct 12 can collapse, as a result of which the inside cross section is reduced. During the finishing, the cooling duct 12 in the cooling plate 3 is finally shaped. That is to say, the cooling duct 12 obtains its final inside contour. An internal pressure is applied to the cooling duct 12 for the purpose of the final shaping. As a result, the shape of the cross-sectional region of the cooling duct 12 that is reduced during the folding or bending process in the region of the bend 21 is restored again.

As an alternative, the shape of the cooling duct 12 can also be restored by an external tensile force or said cooling duct can be protected by a removable inner supporting element before collapsing during the bending process.

Furthermore, the cooling plate 3 can have a material store in the region of the bend 21 of the cooling duct 12, which material store is formed into the bend 21 at the bottom edge 20 during the folding.

Figure 12:
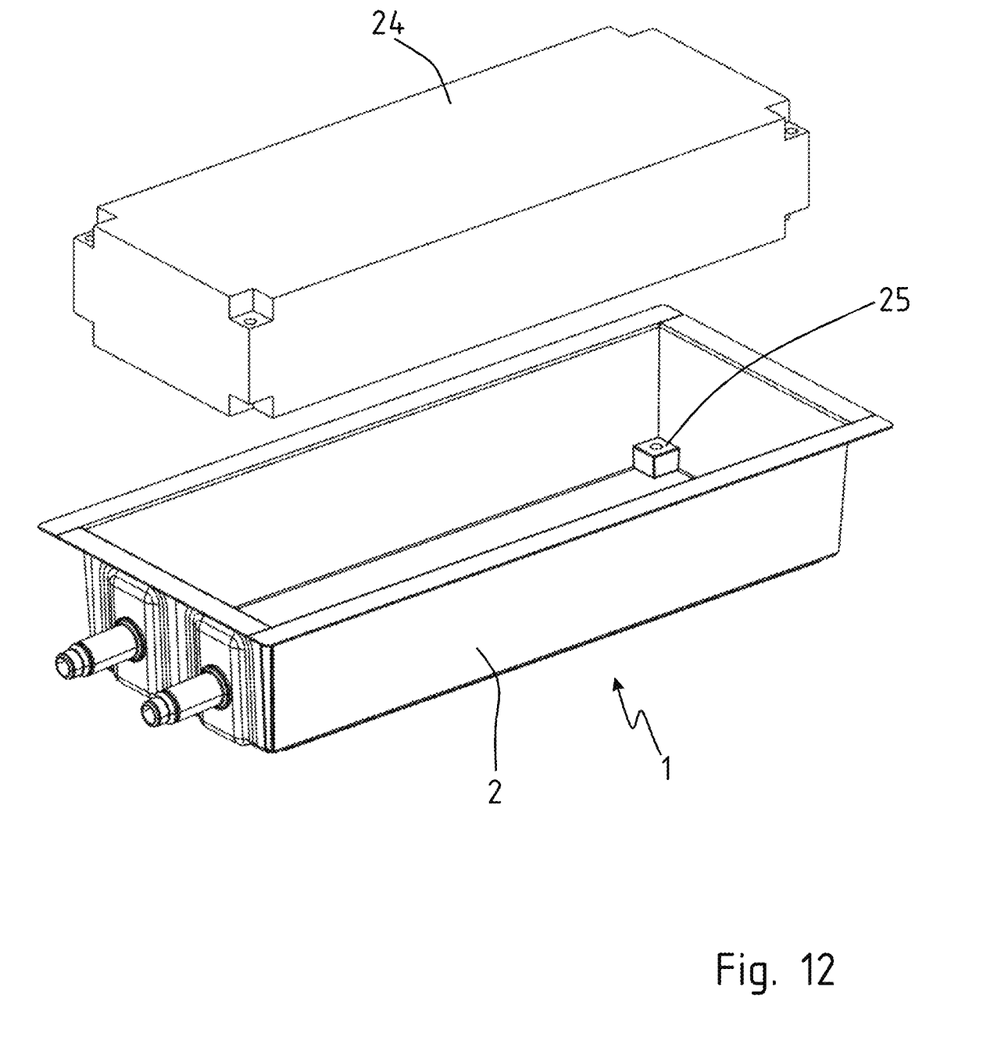
FIG. 12 shows a perspective illustration of a battery carrier with a battery module indicated pulled-out in an exploded manner.

FIG. 12 shows the battery carrier 1 with a battery module 24 indicated pulled-out in an exploded manner. Fitting elements 25, by means of which the battery can be secured in the battery tray 2 (also see FIG. 2 in this respect), are positioned in the battery tray 2.

Figure 13:
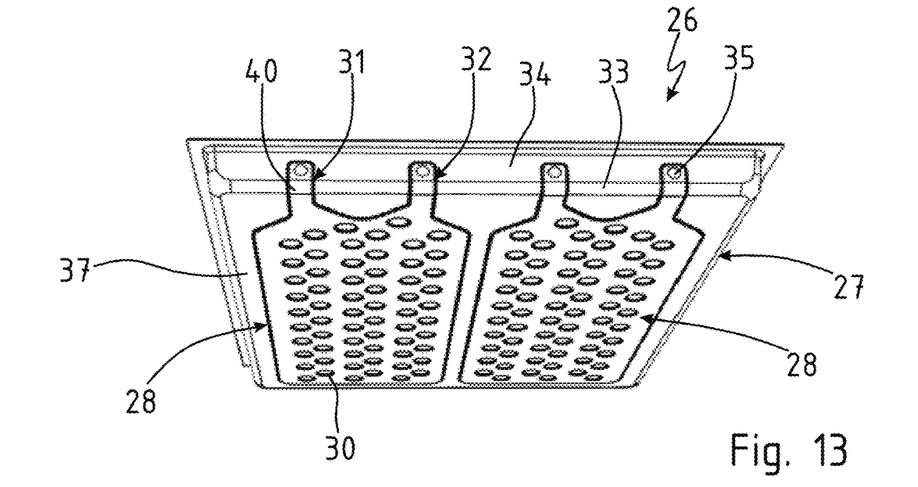
FIG. 13 to FIG. 15 show various perspectives of a further embodiment of a battery carrier according to the disclosure.
Figure 14:
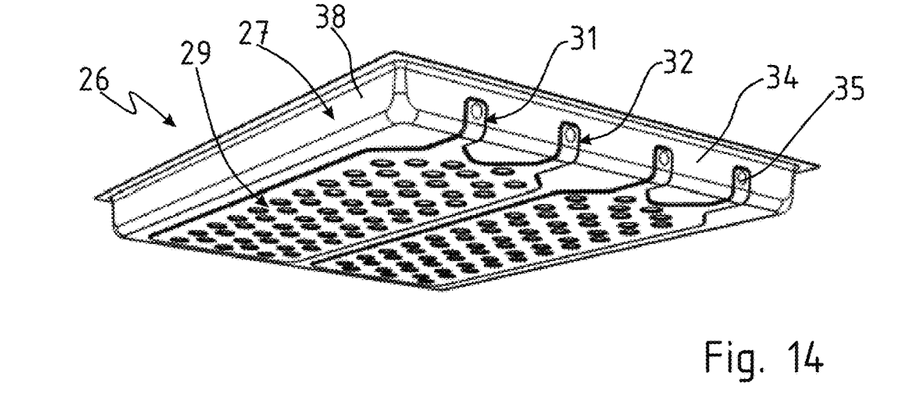
Figure 15:
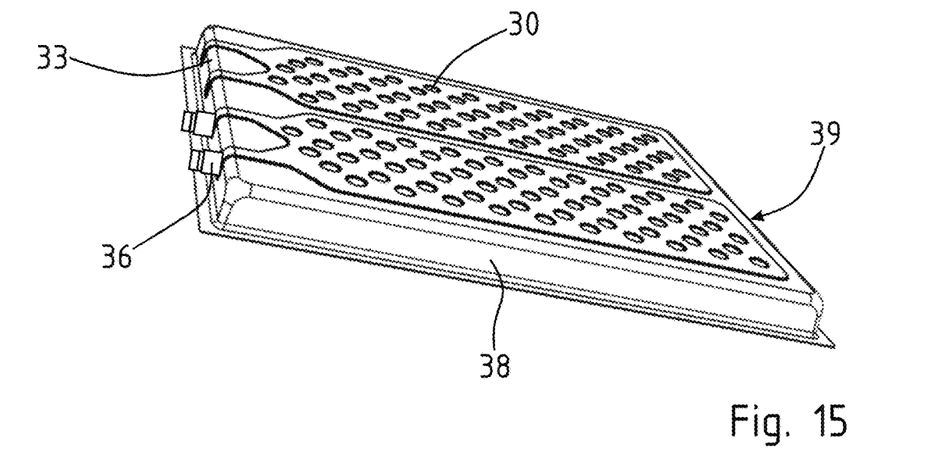

An alternative refinement of a battery carrier 26 according to the disclosure is illustrated from various perspectives in FIG. 13 to FIG. 15.

Figure 1:
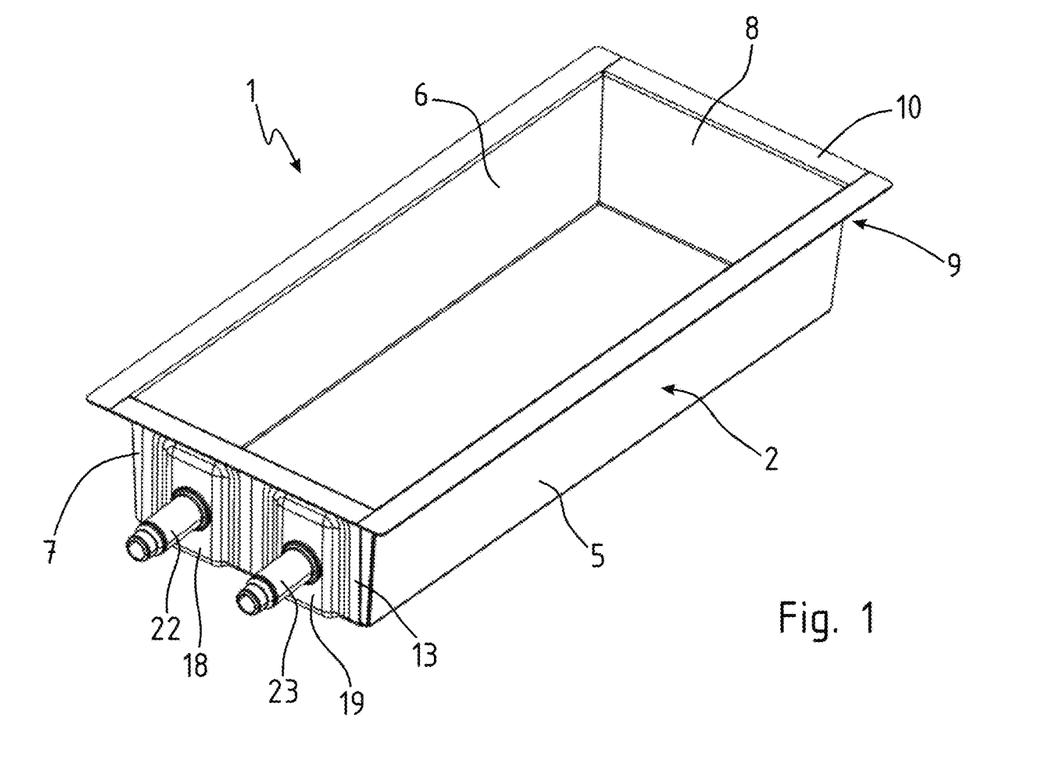
FIG. 1 to FIG. 10 show various views of a battery carrier produced in line with the method according to the disclosure and components thereof.
Figure 2:
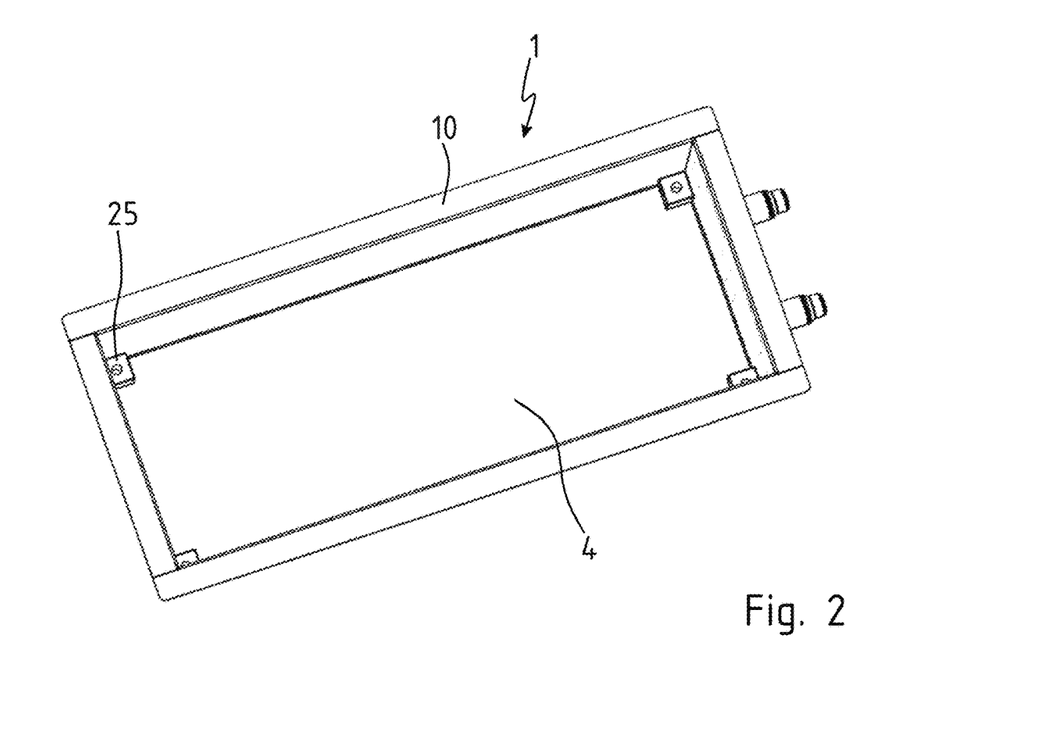
Figure 3:
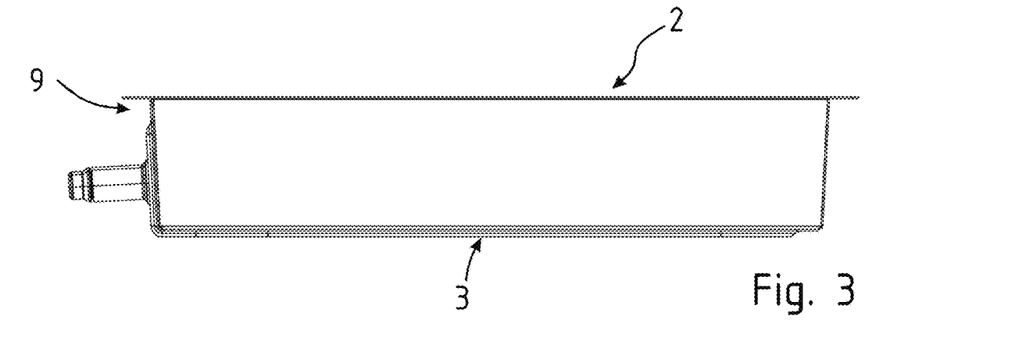
Figure 4:
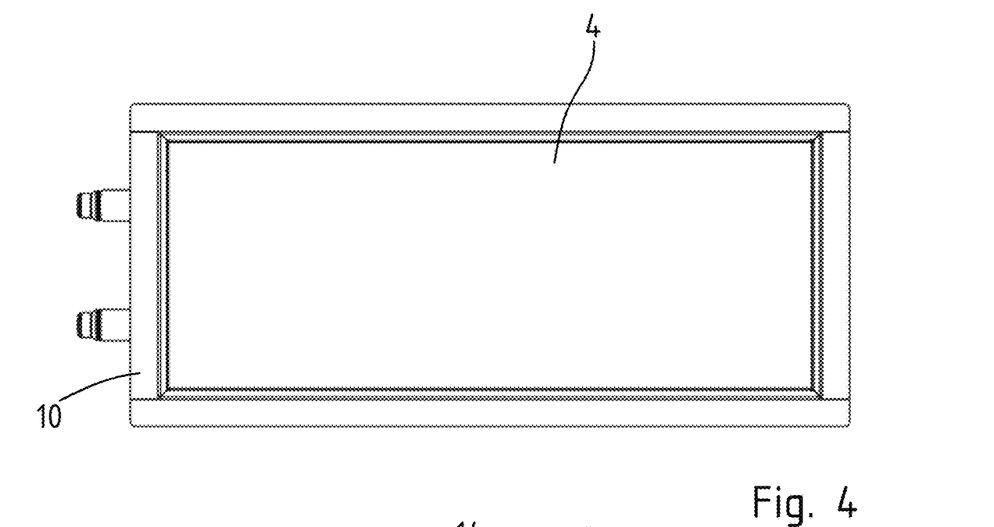
Figure 5:
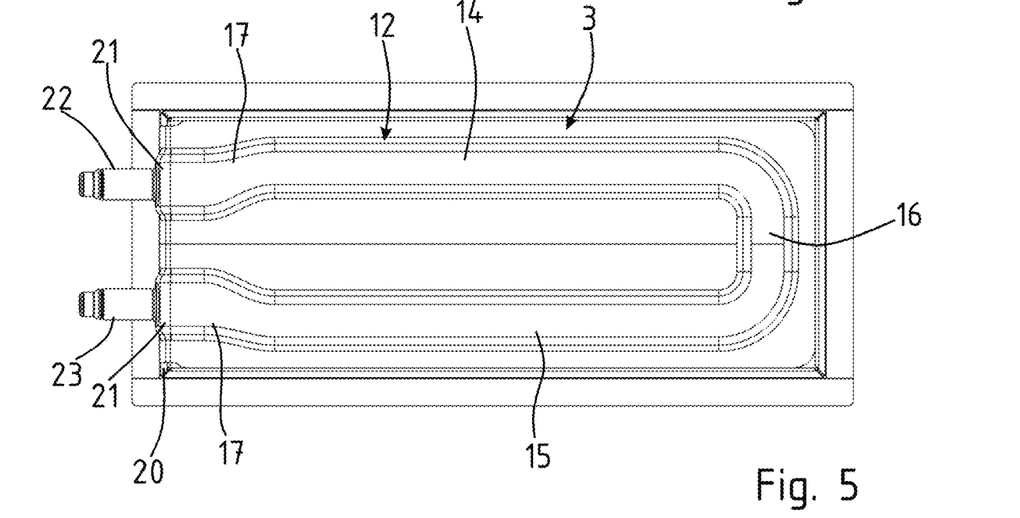
Figure 9:
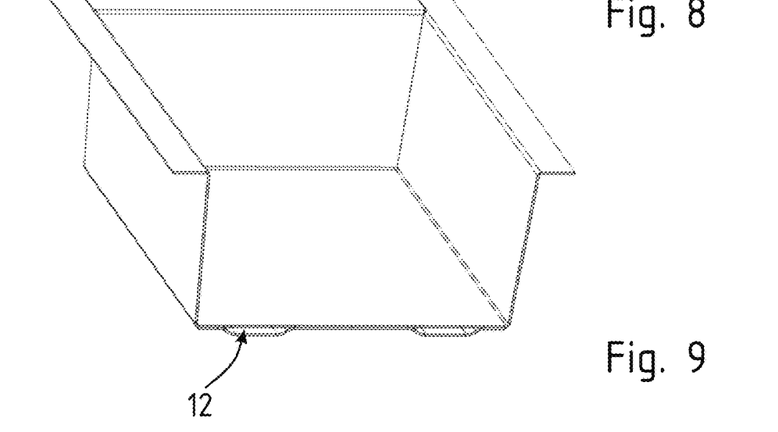
Figure 10:
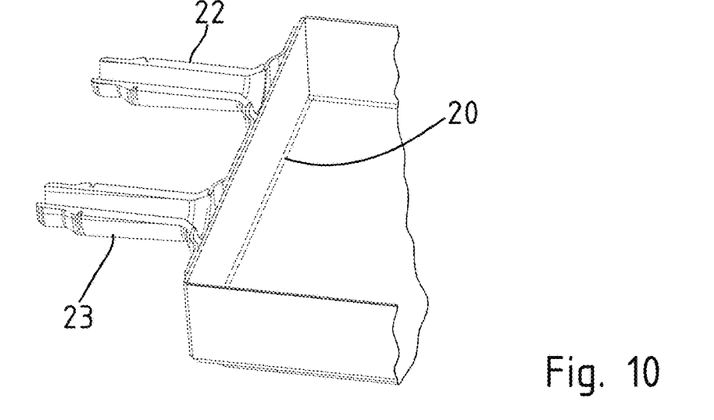

The battery carrier 26 has a battery tray 27 with a cooling plate 28. A tray plate and a cooling plate 28 are also provided for producing the battery tray 26. The cooling plate 28 has at least one preshaped cooling duct 29. This cooling duct is merely indicated in FIG. 13 to FIG. 15. Here, the cooling duct 29 is formed by indentations 30 or between indentations 30 in the cooling plate 28. In principle, the cooling duct 29 can be configured as shown in FIG. 5, FIG. 7 or FIG. 9.

The tray plate and the cooling plate 28 are joined to one another by soldering in a press by means of pressure soldering or in a soldering furnace. The planar two-layer body formed from the tray plate and the cooling plate 28 is then arranged in a deep-drawing tool. The tray plate is then deep-drawn jointly with the cooling plate 28 to produce the battery tray 27. During the deep-drawing of the tray plate and the cooling plate 28, a cooling duct section 31, 32 is bent around a bottom edge 33 of the battery tray 27. The cooling duct 29 or the cooling duct sections 31, 32 runs/run upward on the front end wall 34 in a manner bent around the bottom edge 33.

Following this, the finishing of the battery carrier 26 takes place, where the cooling duct 29 or the cooling duct sections 31, 32 are each provided with connection openings 35 and connection elements 36. Connection elements 36 are indicated in FIG. 15. It goes without saying that all cooling ducts 29 are provided with corresponding connection elements 36.

In the battery carrier 26, as illustrated in FIG. 13 to FIG. 15, two separate cooling plates 28 are arranged below the battery tray 27 on the tray base 36. A cooling plate 28 can be provided, which covers the tray base 37 over virtually its entire surface area and is provided with a corresponding profile of the cooling duct or ducts 29.

Furthermore, the cooling plate 28 with the cooling ducts 29 can extend, in addition to the tray base 37 or alternatively, along side walls, longitudinal side walls 38, but also on the front end wall 34 and the rear end wall 39.

In the battery carrier 26 in which the tray plate and the cooling plate 28 are jointly deep-drawn, the cooling duct 29 can also be finally shaped after the deep-drawing process. During the final shaping, the cooling duct 29 obtains its final inside cross section or its inside contour. To this end, internal pressure can be applied to the cooling duct 29. Furthermore, the final shaping of the cooling duct 29 can be performed using an external tensile force. Furthermore, the cooling duct 29 can be protected against a reduction in cross section by a removable inner supporting element during the deep-drawing process. Finally, as early as on the initially planar cooling plate 28, a material store can be provided in the region of a subsequent bend, which material store is formed into a bend 40 at the bottom edge 33 during the turning over or bending of the cooling duct 29.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A method of producing a battery carrier, the method comprising:
   joining a tray plate to a cooling plate having at least one preshaped cooling duct;
   forming the tray plate jointly with the cooling plate to produce a battery tray, wherein
      during the forming of the tray plate and the cooling plate, the tray plate is deep-drawn jointly with the cooling plate to produce the battery tray, and a cooling duct section of the cooling duct is bent around an edge of the battery tray to form a bend of the cooling plate, and
      the cooling plate has a material store which is formed into the bend of the cooling duct during the forming; and
   finishing the battery carrier, wherein
      the cooling duct is provided with connection elements, and
      during the finishing, the cooling duct in the cooling plate is finally shaped, wherein an internal pressure is applied to the cooling duct for final shaping of the cooling duct,
   during bending of the cooling duct around the edge of the battery tray, a cross section of the cooling duct is reduced,
   for the final shaping of the cooling duct, the internal pressure is applied, in a hydraulic or pneumatic manner, to the cooling duct to restore the cross section that is reduced during the bending,
   in the joining, the tray plate and the cooling plate are joined to one another to obtain a two-layer body, and
   in the forming,
      the two-layer body formed from the tray plate and the cooling plate is arranged in a deep-drawing tool, and the tray plate is then deep-drawn jointly with the cooling plate, and
      during deep-drawing of the tray plate and the cooling plate, the cooling duct section of the cooling duct is bent around the edge of the battery tray.

2. The method as claimed in claim 1, wherein the tray plate geometrically corresponds to a developed view of the battery tray.

3. The method as claimed in claim 1, wherein the cooling plate is joined to a side of the tray plate, said side comprising an outer side of the battery tray after the forming.

4. The method as claimed in claim 1, wherein, in the joining, the tray plate and the cooling plate are joined to one another in a press by pressure soldering or in a soldering furnace.

* * * * *